United States Patent
Butaeva et al.

(10) Patent No.: US 12,510,692 B2
(45) Date of Patent: Dec. 30, 2025

(54) PROTECTION OF OPTICAL MATERIALS OF OPTICAL COMPONENTS FROM RADIATION DEGRADATION

(71) Applicants: KLA CORPORATION, Milpitas, CA (US); Carl Zeiss SMT GMBH, Oberkochen (DE)

(72) Inventors: Evgeniia Butaeva, San Jose, CA (US); Gildardo Delgado, Livermore, CA (US); Grace Chen, Los Gatos, CA (US); John Savee, San Francisco, CA (US); Matthew Derstine, Los Gatos, CA (US); Vera (Guorong) Zhuang, San Jose, CA (US); Gary V. Lopez Lopez, Sunnyvale, CA (US); Felix Lange, Oberkochen (DE); Larissa Walter, Oberkochen (DE)

(73) Assignees: KLA Corporation, Milpitas, CA (US); Carl Zeiss SMT GmbH, Oberkochen (DE)

( * ) Notice: Subject to any disclaimer, the term of this patent is extended or adjusted under 35 U.S.C. 154(b) by 695 days.

(21) Appl. No.: 17/393,968

(22) Filed: Aug. 4, 2021

(65) Prior Publication Data
US 2022/0066071 A1  Mar. 3, 2022

Related U.S. Application Data

(60) Provisional application No. 63/070,842, filed on Aug. 27, 2020.

(51) Int. Cl.
G02B 1/14  (2015.01)
C01F 5/28  (2006.01)

(52) U.S. Cl.
CPC . *G02B 1/14* (2015.01); *C01F 5/28* (2013.01)

(58) Field of Classification Search
CPC .... G02B 1/14; G02B 1/02; G02B 1/10; C01F 5/28; C03C 17/06; C08J 7/06
See application file for complete search history.

(56) References Cited

U.S. PATENT DOCUMENTS

| | | | |
|---|---|---|---|
| 8,169,705 B2 | 5/2012 | Cangemi et al. | |
| 2002/0020338 A1* | 2/2002 | Oba | C30B 29/12 117/13 |

(Continued)

FOREIGN PATENT DOCUMENTS

| | | |
|---|---|---|
| DE | 102011054837 A1 | 5/2013 |
| DE | 102018221190 A1 | 6/2020 |

(Continued)

OTHER PUBLICATIONS

International Search Report regarding corresponding PCT App. No. PCT/US2021/047423; mailed Dec. 1, 2021.

(Continued)

*Primary Examiner* — Bumsuk Won
*Assistant Examiner* — John Curtis Sipes
(74) *Attorney, Agent, or Firm* — DICKINSON WRIGHT PLLC

(57) ABSTRACT

An optical system includes a bulk material including a fluorine (F)-containing optical material. The bulk material is exposed to an environment at a pressure ranging from atmospheric to vacuum when the bulk material is under extreme ultra-violet (EUV), vacuum ultra-violet (VUV), deep ultra-violet (DUV) and/or UV radiation. The environment includes at least one type of gas or vapor. The at least one type of gas or vapor includes polar molecules.

17 Claims, 1 Drawing Sheet

(56) References Cited

U.S. PATENT DOCUMENTS

| | | | |
|---|---|---|---|
| 2002/0084425 A1 | 7/2002 | Klebanoff et al. | |
| 2003/0219056 A1 | 11/2003 | Yager et al. | |
| 2004/0121243 A1 | 6/2004 | Chandhok et al. | |
| 2004/0202225 A1 | 10/2004 | Maier et al. | |
| 2006/0018018 A1* | 1/2006 | Nomura | G03F 7/70566 |
| | | | 359/487.02 |
| 2006/0046099 A1 | 3/2006 | Maier et al. | |
| 2007/0003208 A1* | 1/2007 | Clar | G02B 1/113 |
| | | | 385/147 |
| 2007/0007491 A1* | 1/2007 | Mueller | G02B 27/281 |
| | | | 252/299.01 |
| 2007/0195307 A1* | 8/2007 | Schuster | G02B 13/143 |
| | | | 359/717 |
| 2012/0250144 A1 | 10/2012 | Ehm et al. | |
| 2014/0158914 A1 | 6/2014 | Klebanoff et al. | |
| 2015/0099126 A1* | 4/2015 | Honda | G02B 5/30 |
| | | | 428/447 |
| 2015/0168609 A1* | 6/2015 | Fukui | G02B 1/118 |
| | | | 359/601 |
| 2015/0241605 A1* | 8/2015 | Cox | C04B 41/00 |
| | | | 428/448 |
| 2016/0187543 A1 | 6/2016 | Bekman et al. | |
| 2017/0031067 A1* | 2/2017 | Quijada | G02B 1/14 |
| 2017/0066890 A1* | 3/2017 | Oser | C23C 16/00 |

FOREIGN PATENT DOCUMENTS

| | | | | |
|---|---|---|---|---|
| DE | 102018221191 A1 | | 6/2020 | |
| GB | 2431670 A | * | 5/2007 | G02B 1/10 |
| JP | 2003014921 A | | 1/2003 | |
| JP | 2004035370 A | | 2/2004 | |
| KR | 10-2007-0084558 A | | 8/2007 | |
| TW | 201324062 A | | 6/2013 | |
| WO | 99/049366 | | 3/1999 | |
| WO | 2004006309 A1 | | 1/2004 | |

OTHER PUBLICATIONS

Rothschild, M., et al., "Recent trends in optical lithography," Lincoln Laboratory Journal, Massachusetts Institute of Technology, Lincoln Laboratory, US, vol. 14, No. 2, Jan. 1, 2003, pp. 221-236.

English translation of First Office Action regarding corresponding CN App. No. 202180053027.5; issued Aug. 29, 2025.

* cited by examiner

PROTECTION OF OPTICAL MATERIALS OF OPTICAL COMPONENTS FROM RADIATION DEGRADATION

CROSS REFERENCE TO RELATED APPLICATIONS

This application claims priority to U.S. Provisional Patent Application 63/070,842, filed Aug. 27, 2020, the content of which is hereby incorporated by reference in its entirety.

TECHNICAL FIELD

The present disclosure relates to protection of optical materials of optical components from radiation degradation, for example, protection of fluorine (F)-containing optical materials of optical components from degradation under radiation.

BACKGROUND

F-containing optical materials are commonly used for broadband optical applications and/or systems, ranging from vacuum ultra-violet (VUV) to near-infrared (NIR) optical applications and/or systems. The performance of the F-containing optical materials can be rapidly degraded in extreme ultra-violet (EUV), VUV, deep ultra-violet (DUV) and/or UV spectral ranges as a result of radiation degradation, leading to reduced optical performance and life of the optical applications and/or systems.

SUMMARY

According to one embodiment, an optical system is disclosed. The optical system may include a bulk material including a fluorine (F)-containing optical material. The bulk material may be exposed to an environment at a pressure ranging from atmospheric to vacuum when the bulk material is under extreme ultra-violet (EUV), vacuum ultra-violet (VUV), deep ultra-violet (DUV) and/or UV radiation. The environment may include at least one type of gas or vapor. The at least one type of gas or vapor may include polar molecules.

According to another embodiment, an optical system is disclosed. The optical system may include a bulk material including a fluorine (F)-containing optical material. The bulk material may be exposed to an environment at a pressure ranging from atmospheric to vacuum when the bulk material is under extreme ultra-violet (EUV), vacuum ultra-violet (VUV), deep ultra-violet (DUV) and/or UV radiation. The environment may include at least one type of gas or vapor. The at least one type of gas or vapor may include polar molecules. The optical system may further include a coating layer disposed on the bulk material.

According to yet another embodiment, an optical material is disclosed. The optical material may include a bulk material including a fluorine (F)-containing optical material. The F-containing optical material may be selected from the group consisting of magnesium fluoride ($MgF_2$), calcium fluoride ($CaF_2$), lanthanum trifluoride ($LaF_3$), strontium fluoride ($SrF_2$), barium fluoride ($BaF_2$), lithium fluoride (LiF), and a combination thereof. The optical material may further include a coating layer including a coating material disposed on the bulk material, where the coating material may have a reflectivity of at least 20%.

DETAILED DESCRIPTION

Figure 1:
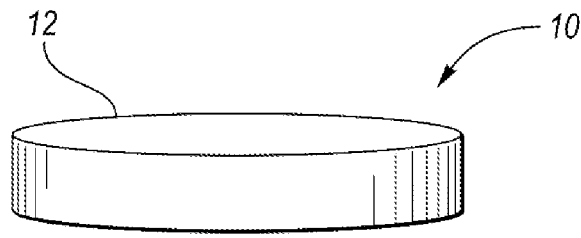
FIG. 1 depicts a schematic diagram of a first embodiment of an exemplary optical system according to the present disclosure.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

An optical component may include a bulk material only. An optical component may include a substrate having an optical surface and a film layer formed on the optical surface, and a protective layer may be deposited on the film layer to protect the optical component from optical degradation. Alternatively, an optical component may include a bulk material, and a protective layer may be deposited onto the bulk material to protect the optical component from optical degradation. The optical degradation may be caused by extreme ultra-violet (EUV), VUV, deep ultra-violet (DUV) and/or UV radiation. VUV radiation generally refers to UV light with a wavelength in a range of 100 to 190 nm. DUV radiation generally refers to UV light with a wavelength in a range of 190 to 280 nm. EUV radiation generally refers to light with a wavelength in a range of 10 to 100 nm. Either the film layer or the bulk material may include an optical material which contains fluorine (F), also referred to as an F-containing optical material. Unfortunately, the F-containing optical material may be degraded by humidity, oxidation, contamination, radiation, and other environmental conditions. Specifically, when the optical component operates under an operation environment (e.g., vacuum containing residual gas or inert atmosphere containing impurities) upon EUV, VUV, DUV and/or UV radiation, the F-containing optical material is susceptible to EUV, VUV, DUV and/or UV radiation degradation, which consequently deteriorates the optical performance of the optical component and shortens the lifetime of the optical component.

Upon exposure to EUV, VUV, DUV and/or UV radiation, fluorine (F) atoms in the F-containing optical material may migrate from their original locations in the F-containing optical material. Some of these F atoms may leave the F-containing optical material. The migration and/or loss of the F atoms create defects, such as fluorian vacancy or interstitial F, in the F-containing optical material. The defects may be surface defects or bulk defects. Either the surface or bulk defects may negatively impact the optical performance of the optical component. For example, the migration and/or loss of the F atoms may induce either surface or subsurface oxidation of the F-containing optical material, and may also cause oxidation of the film layer when the film layer is deposited onto the optical component. Such oxidations may lead to degradation of the optical performance of the optical component over time. Computational calculations based on the Density Function Theory (DFT) also suggest that it is energetically favorable for oxygen to occupy the fluorian vacancy, which can lead to degradation to the optical performance of the optical component.

Optical components, including those applied in EUV, VUV, DUV and/or UV optical applications and/or systems, are expected to have a long durable lifetime, such as ten years or longer. However, due to various detrimental optical degradation, replacement of a degraded optical component is often required. Such a replacement can be expensive. To mitigate radiation degradation to an optical component, optical polishing techniques have been employed to improve or smoothen a rough or degraded optical surface of the optical component. Although using the optical polishing techniques can produce highly accurate optical surfaces, some of the drawbacks of these optical publishing techniques are that they can introduce contaminates and residuals on polished surfaces and require long processing times. Furthermore, the optical polishing techniques can affect the mechanical properties of the optical surface, leading to variations in the optical performance of the optical component. Therefore, there is a need to protect the optical component in a more efficient manner.

Aspects of the present disclosure relate to protection of optical materials of optical components from radiation degradation, especially EUV, VUV, DUV and/or UV radiation degradation. In one embodiment, the present disclosure is directed to an optical system that includes a bulk material having an F-containing optical material, where the bulk material is exposed to an environment at a pressure ranging from atmospheric to vacuum to protect the bulk material from EUV, VUV, DUV and/or UV radiation when the bulk material is under EUV, VUV, DUV and/or UV radiation. The environment may include at least one type of gas or vapor. In another embodiment, the present disclosure is directed to an optical system that includes a bulk material and a coating layer formed on the bulk material, where the bulk material includes an F-containing optical material and is exposed to an environment at a pressure ranging from atmospheric to vacuum to protect the bulk material from EUV, VUV, DUV and/or UV radiation when the bulk material is under EUV, VUV, DUV and/or UV radiation. The environment may include at least one type of gas or vapor. In yet another embodiment, the present disclosure is directed to an optical material that includes a bulk material and a coating layer formed on the bulk material, where the bulk material includes an F-containing optical material and is exposed to an environment at a pressure ranging from atmospheric to vacuum to protect the bulk material from EUV, VUV, DUV and/or UV radiation when the bulk material is under EUV, VUV, DUV and/or UV radiation. The environment may include at least one type of gas or vapor.

FIG. 1 depicts a schematic diagram of a first embodiment of an exemplary optical system 10 according to the present disclosure. The optical system 10 may include an optical material. The optical material may be a bulk material 12 that protects the optical system 10 from optical degradation. The optical degradation may be caused by EUV, VUV, DUV and/or UV radiation. An intensity of the EUV, VUV, DUV and/or UV radiation may be in a range of 5 mW/cm$^2$ to 20 W/cm$^2$. The bulk material 12 may be an F-containing optical material. The F-containing optical material may be, but not limited to, magnesium fluoride ($MgF_2$), calcium fluoride ($CaF_2$), lanthanum trifluoride ($LaF_3$), strontium fluoride ($SrF_2$), barium fluoride ($BaF_2$), lithium fluodie (LiF), or a combination thereof. The optical system 10 may be, but not limited to, optical windows, beam splitters, mirrors, charge-coupled devices (CCDs), detectors, or time delay integration (TDI) CCDs. Upon exposure to EUV, VUV, DUV and/or UV radiation, the bulk material 12 may undergo radiation degradation, including migration and/or loss of the F atoms in the bulk material 12 and/or surface reconstruction. Such radiation induced degradation may consequently result in an adverse effect on the optical performance of the optical system 10.

To protect the bulk material 12 of the optical system 10 from radiation degradation, especially EUV, VUV, DUV and/or UV radiation degradation, the optical system 10 or the bulk material 12 of the optical system 10 may be exposed to an environment at a pressure ranging from atmospheric to vacuum (e.g., sub-atmospheric pressure) when it is subject to optical radiation. The environment may include at least one type of gas or vapor. The at least one type of gas or vapor may be condensed on a surface of the bulk material 12. The at least one type of gas or vapor may include polar molecules. In some embodiments, the at least one type of gas or vapor may include water ($H_2O$). In some other embodiments, the at least one type of gas or vapor may include other polar molecules having a dipole moment comparable to that of $H_2O$. As described herein, the dipole moment of a molecule is the measurement of the molecular polarity of a chemical bond within the molecule. The dipole moment of $H_2O$ is about 1.85 debye (D). The dipole moment of the polar molecules may be in a range of 1.3 to 2.5 D. The other polar molecules may be heavy water ($D_2O$), methanol ($CH_3OH$), ethylene glycol (($CH_2OH)_2$), ethanol ($CH_3CH_2OH$), ammonia ($NH_3$), or a combination thereof. A concentration of the at least one type of gas or vapor exposing to the optical system 10 or the bulk material 12 of the optical system 10 may be less than 20 parts per million (ppm) by volume of the environment. The concentration of the at least one type of gas or vapor may be controlled at a certain level such that the presence of the at least one type of gas or vapor may not interfere with the optical radiation (e.g. attenuate the optical radiation intensity) directing to the optical system 10 and, at the same time, may still protect the optical system 10 from the optical radiation.

In order to protect the bulk material 12 of the optical system 10 from radiation degradation, especially EUV, VUV, DUV and/or UV radiation degradation, the polar molecules in the environment may physically or chemically interact with the bulk material 12, such as forming bonds on a surface of the bulk material 12. The polar molecules may quench dangling bonds (i.e. broken bonds) in the bulk material 12. The dangling bonds may be preexisting or generated due to surface polishing. By physically or chemically interacting with the bulk material 12, a surface energy of the bulk material 12 may be lowered, making the bulk material 12 more stable. In addition, due to being surrounded by the polar molecules, it is energetically unfavorable for the bulk material 12 to undergo surface changes, for example, surface reconstruction or phase transition.

To expose the bulk material 12 of the optical system 10 to the environment, a purge gas may be used. The purge gas may be mixed with the at least one type of gas or vapor. To keep the bulk material 12 from contamination, the at least one type of gas or vapor as well as the purge gas may be purified before being introduced to the bulk material 12. The purge gas may be, but not limited to, nitrogen ($N_2$), helium (He), carbon monoxide (CO), carbon dioxide ($CO_2$), krypton (Kr), argon (Ar), xenon (Xe), hydrogen ($H_2$), compressed dry air, or a combination thereof. The amount of the at least one type of gas or vapor introduced by the purge gas may be controlled at a certain level such that the presence of the at least one type of gas or vapor may not interfere with the optical radiation (e.g. attenuate the radiation intensity) directing to the optical system 10 and, at the same time, may still protect the optical system 10 from the optical radiation.

Figure 2:
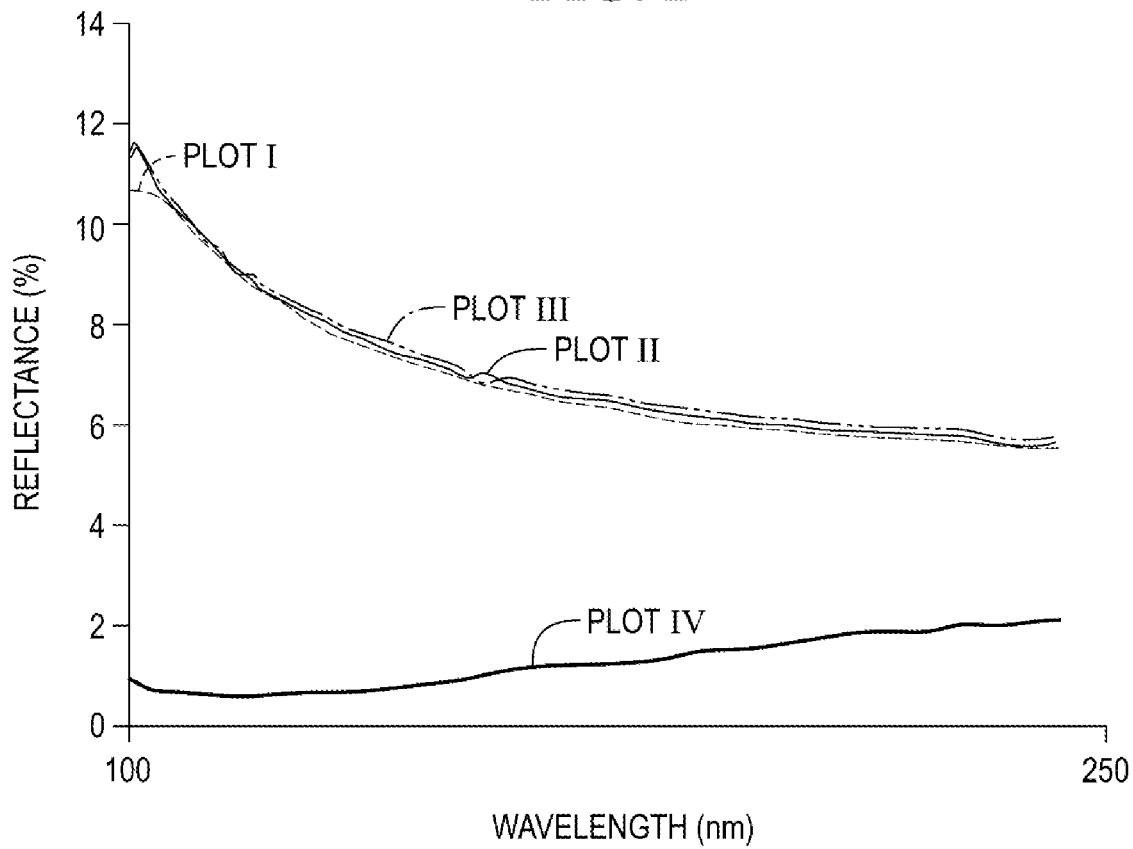
FIG. 2 depicts reflectance spectra of $MgF_2$ and spectral changes when $MgF_2$ is under VUV radiation.

FIG. 2 depicts reflectance spectra of $MgF_2$ and spectral changes when $MgF_2$ is under VUV radiation. Particularly, Plot I represents spectral changes when $MgF_2$ is not under VUV radiation, and Plots II, III and IV represent spectral changes when $MgF_2$ is under VUV radiation. FIG. 2 shows the reflectance spectra in a wavelength range of 100 to 250 nm. The intensity of the VUV radiation is 100 mW/cm². A duration of the VUV radiation is one week. $MgF_2$ may be exposed to an environment at a pressure ranging from atmospheric to vacuum (e.g., sub-atmospheric pressure) when it is subject to VUV radiation. The environment may include $H_2O$. The concentration of $H_2O$ in the environment may vary. Purified Ar gas is used to introduce $H_2O$ to $MgF_2$.

Radiation to an optical material may create surface defects in the optical material. Such surface defects may result in a reduction or increase of the reflectance value of the optical material. Referring to FIG. 2, Plot I represents a scenario where no VUV radiation is directed to $MgF_2$ (e.g. before optical radiation). Plot IV represents a scenario where VUV radiation is directed to $MgF_2$ while $MgF_2$ is exposed to an environment with a relatively low $H_2O$ concentration, such as 0.1 ppm by volume of the environment. Plots II and III represent scenarios where VUV radiation is directed to $MgF_2$ while $MgF_2$ is exposed to an environment with a relatively high $H_2O$ concentration, such as 10 ppm and 1 ppm by volume of the environment, respectively. As shown by Plot IV, the reflectance value of $MgF_2$ appears to decrease over the one-week VUV radiation. However, after the one-week VUV radiation, the amount of spectral changes of $MgF_2$ for Plots II and III is negligible in comparison with that for Plot I (i.e. where no VUV radiation is directed to $MgF_2$).

Continuing referring to FIG. 2, Plots II and III appear to indicate that when $MgF_2$ is exposed to an environment with a relatively high $H_2O$ concentration, such as in a range of 1 to 10 ppm by volume of the environment, the presence of $H_2O$ may not interfere with the optical radiation (e.g. attenuate the radiation intensity) directed to $MgF_2$ and, at the same time, may still protect $MgF_2$ from radiation induced degradation. In contrast to Plots II to III, the reflectance values of $MgF_2$ for Plot IV appears to be significantly lower. This appears to suggest that exposing $MgF_2$ to a certain amount of $H_2O$ when $MgF_2$ is under VUV radiation may protect $MgF_2$ from the VUV radiation; however, when the amount of $H_2O$ introduced to $MgF_2$ is relatively low, such as 0.1 ppm by volume of the environment, exposing $MgF_2$ to the low amount of $H_2O$ may not effectively protect $MgF_2$ from the VUV radiation.

Figure 3:
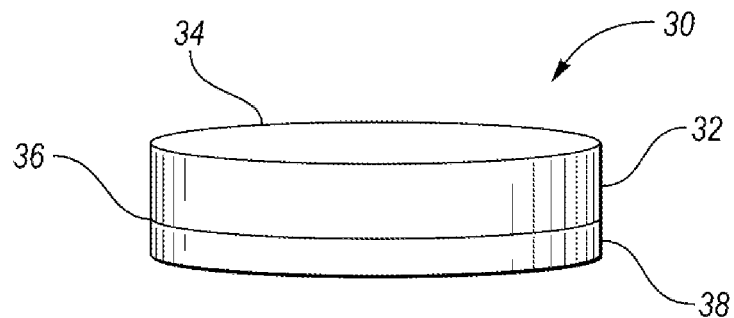
FIG. 3 depicts a schematic diagram of a second embodiment of an exemplary optical system according to the present disclosure.

FIG. 3 depicts a schematic diagram of a second embodiment of an exemplary optical system 30 according to the present disclosure. The optical system 30 may include an optical material. The optical material may be a bulk material 32 that protects the optical system 30 from optical degradation. The optical degradation may be caused by EUV, VUV, DUV and/or UV radiation. An intensity of the EUV, VUV, DUV and/or UV radiation may be in a range of 5 mW/cm² to 20 W/cm². The bulk material 32 may be an F-containing optical material. The F-containing optical material may be, but not limited to, $MgF_2$, $CaF_2$, $LaF_3$, $SrF_2$, $BaF_2$, LiF, or a combination thereof. The optical system may be, but not limited to, optical windows, beam splitters, mirrors, charge-coupled devices (CCDs), detectors, or time delay integration (TDI) CCDs. Upon exposure to EUV, VUV, DUV and/or UV radiation, the bulk material 32 of the optical system 30 may undergo radiation degradation, including migration and/or loss of the F atoms in the bulk material 32. Such radiation degradation may consequently induce an adverse effect on the optical performance of the optical system 30.

Referring to FIG. 3, the bulk material 32 may include a first side 34 and a second side 36 opposite the first side 34. The optical system 30 may include a coating layer 38 formed on the second side 36 of the bulk material 32. It is contemplated that the coating layer 38 may also be formed on the first side 34 of the bulk material 32. The coating layer 38 may include a coating material. The coating material may have a reflectivity of at least 20%. The coating material may be, but not limited to, aluminum (Al), gold (Au), silver (Ag), copper (Cu), chromium (Cr), titanium (Ti), ruthenium (Ru), $MgF_2$, $CaF_2$, $LaF_3$, $SrF_2$, $BaF_2$, LiF, or a combination thereof. The coating layer 38 may be a single layer or multiple layers. By forming the coating layer 38 on the bulk material 32, the bulk material 32 may act as a radiation reflector, such as a VUV radiation reflector.

To protect the bulk material 32 of the optical system 30 from radiation degradation, especially EUV, VUV, DUV and/or UV radiation degradation, the optical system 30 or the bulk material 32 of the optical system 30 may be exposed to an environment at a pressure ranging from atmospheric to vacuum (e.g., sub-atmospheric pressure) when it is subject to optical radiation. The environment may include at least one type of gas or vapor. The at least one type of gas or vapor may be condensed on a surface of the bulk material 32, for example, on the first side 34 of the bulk material 32. The at least one type of gas or vapor may include polar molecules. In some embodiments, the at least one type of gas or vapor may include water ($H_2O$). In some other embodiments, the at least one type of gas or vapor may include other polar molecules having a dipole moment comparable to that of $H_2O$. As described herein, the dipole moment of a molecule is the measurement of the molecular polarity of a chemical bond within the molecule. The dipole moment of $H_2O$ is about 1.85 debye (D). The dipole moment of the polar molecules may be in a range of 1.3 to 2.5 D. The other polar molecules may be heavy water ($D_2O$), methanol ($CH_3OH$), ethylene glycol (($CH_2OH)_2$), ethanol ($CH_3CH_2OH$), ammonia ($NH_3$), or a combination thereof. A concentration of the at least one type of gas or vapor exposing to the optical system 30 or the bulk material 32 of the optical system 30 may be less than 20 parts per million (ppm) by volume of the environment. The concentration of the at least one type of gas or vapor may be controlled at a certain level such that the presence of the at least one type of gas or vapor may not interfere with the optical radiation (e.g. attenuate the radiation intensity) directing to the optical system 30 and, at the same time, may still protect the optical system 30 from the optical radiation.

In order to protect the bulk material 32 of the optical system 30 from radiation degradation, especially EUV, VUV, DUV and/or UV radiation degradation, the polar molecules in the environment may physically or chemically interact with the bulk material 32, such as forming bonds to the atoms on a surface of the bulk material 32. The polar molecules may quench dangling bonds (i.e. broken bonds) in the bulk material 32. The dangling bonds may be preexisting or generated due to surface polishing. By physically or chemically interacting with the bulk material 32, a surface energy of the bulk material 32 may be lowered, making the bulk material 32 more stable. In addition, due to being surrounded by the polar molecules, it is energetically unfavorable for the bulk material 32 to undergo surface changes, for example, surface reconstruction or phase transition.

To expose the bulk material 32 of the optical system 30 to the environment, a purge gas may be used. The purge gas may be mixed with the at least one type of gas or vapor. To keep the bulk material 32 from contamination, the at least one type of gas or vapor as well as the purge gas may be purified before being introduced to the bulk material 32. The purge gas may be, but not limited to, nitrogen ($N_2$), helium (He), carbon monoxide (CO), carbon dioxide ($CO_2$), krypton (Kr), argon (Ar), xenon (Xe), hydrogen ($H_2$), compressed dry air, or a combination thereof. The amount of the at least one type of gas or vapor introduced by the purge gas may be controlled at a certain level such that the presence of the at least one type of gas or vapor may not interfere with the optical radiation (e.g. attenuate the radiation intensity) directing to the optical system 30 and, at the same time, may still protect the optical system 30 from the optical radiation.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. An optical system comprising:
   a bulk material including a fluorine (F)-containing optical material;
   an active operating environment including a pressure ranging from atmospheric to vacuum and at least one type of gas or vapor, the at least one type of gas or vapor including polar molecules;
   wherein the bulk material is exposed to the active operating environment to protect the bulk material from radiation degradation caused by extreme ultra-violet (EUV), vacuum ultra-violet (VUV), deep ultra-violet (DUV) and/or UV radiation; and
   wherein the at least one type of gas or vapor is introduced to the bulk material using a purge gas.

2. The optical system of claim 1, wherein the F-containing optical material is selected from the group consisting of magnesium fluoride ($MgF_2$), calcium fluoride ($CaF_2$), lanthanum trifluoride ($LaF_3$), strontium fluoride ($SrF_2$), barium fluoride ($BaF_2$), lithium fluoride (LiF), and a combination thereof.

3. The optical system of claim 1, wherein the at least one type of gas or vapor includes water ($H_2O$).

4. The optical system of claim 1, wherein the at least one type of gas or vapor includes polar molecules having a dipole moment comparable to that of $H_2O$.

5. The optical system of claim 4, wherein the polar molecules are selected from the group consisting of heavy water ($D_2O$), methanol ($CH_3OH$), ethylene glycol (($CH_2OH)_2$), ethanol ($CH_3CH_2OH$), ammonia ($NH_3$), and a combination thereof.

6. The optical system of claim 1, wherein a concentration of the at least one type of gas or vapor is less than 20 parts per million (ppm) by volume of the operating environment.

7. The optical system of claim 1, wherein the purge gas is selected from the group consisting of nitrogen ($N_2$), helium (He), carbon monoxide (CO), carbon dioxide ($CO_2$), krypton (Kr), argon (Ar), xenon (Xe), hydrogen ($H_2$), compressed dry air, and a combination thereof.

8. An optical system comprising:
   a bulk material including a fluorine (F)-containing optical material;
   an active operating environment including a pressure ranging from atmospheric to vacuum and at least one type of gas or vapor, the at least one type of gas or vapor including polar molecules; and
   wherein the bulk material is exposed to the active operating environment to protect the bulk material from radiation degradation caused by extreme ultra-violet (EUV), vacuum ultra-violet (VUV), deep ultra-violet (DUV) and/or UV radiation, wherein an intensity of the EUV, VUV, DUV and/or UV radiation is in a range of 5 mW/cm$^2$ to 20 W/cm$^2$.

9. An optical system comprising:
   a bulk material including a fluorine (F)-containing optical material;
   a coating layer disposed on the bulk material;
   an active operating environment including a pressure ranging from atmospheric to vacuum and at least one type of gas or vapor, the at least one type of gas or vapor including polar molecules;
   wherein the bulk material is exposed to the active operating environment to protect the bulk material from radiation degradation caused by extreme ultra-violet (EUV), vacuum ultra-violet (VUV), deep ultra-violet (DUV) and/or UV radiation;
   wherein an intensity of the EUV, VUV, DUV and/or UV radiation is in a range of 5 mW/cm$^2$ to 20 W/cm$^2$; and
   wherein a concentration of the at least one type of gas or vapor is less than 20 parts per million (ppm) by volume of the operating environment.

10. The optical system of claim 9, wherein the F-containing optical material is selected from the group consisting of magnesium fluoride ($MgF_2$), calcium fluoride ($CaF_2$), lanthanum trifluoride ($LaF_3$), strontium fluoride ($SrF_2$), barium fluoride ($BaF_2$), lithium fluoride (LiF), and a combination thereof.

11. The optical system of claim 9, wherein the at least one type of gas or vapor is water ($H_2O$).

12. The optical system of claim 9, wherein the at least one type of gas or vapor includes polar molecules having a dipole moment comparable to that of $H_2O$.

13. The optical system of claim 12, wherein the polar molecules are selected from the group consisting of heavy water ($D_2O$), methanol ($CH_3OH$), ethylene glycol (($CH_2OH)_2$), ethanol ($CH_3CH_2OH$), ammonia ($NH_3$), and a combination thereof.

14. The optical system of claim 9, wherein the coating layer includes a coating material, where the coating material has a reflectivity of at least 20%.

15. The optical system of claim 14, wherein the coating material is selected from the group consisting of aluminum (Al), gold (Au), silver (Ag), copper (Cu), chromium (Cr), titanium (Ti), ruthenium (Ru), magnesium fluoride ($MgF_2$), calcium fluoride ($CaF_2$), lanthanum trifluoride ($LaF_3$), strontium fluoride ($SrF_2$), barium fluoride ($BaF_2$), lithium fluoride (LiF), and a combination thereof.

16. An optical system comprising:
   a bulk material including a fluorine (F)-containing optical material, wherein the F-containing optical material is selected from the group consisting of magnesium fluoride ($MgF_2$), calcium fluoride ($CaF_2$), lanthanum trifluoride ($LaF_3$), strontium fluoride ($SrF_2$), barium fluoride ($BaF_2$), lithium fluoride (LiF), and a combination thereof;
   a coating layer including a coating material disposed on the bulk material, wherein the coating material has a reflectivity of at least 20%;
   an active operating environment including at least one type of gas or vapor, the at least one type of gas or vapor including polar molecules;
   wherein the bulk material is exposed to the active operating environment to protect the bulk material from radiation degradation caused by extreme ultra-violet (EUV), vacuum ultra-violet (VUV), deep ultra-violet (DUV) and/or UV radiation; and
   wherein an intensity of the EUV, VUV, DUV and/or UV radiation is in a range of 5 $mW/cm^2$ to 20 $W/cm^2$.

17. The optical material of claim 16, wherein the coating material is selected from the group consisting of aluminum (Al), gold (Au), silver (Ag), copper (Cu), chromium (Cr), titanium (Ti), ruthenium (Ru), magnesium fluoride ($MgF_2$), calcium fluoride ($CaF_2$), lanthanum trifluoride ($LaF_3$), strontium fluoride ($SrF_2$), barium fluoride ($BaF_2$), lithium fluoride (LiF), and a combination thereof.

* * * * *